Oct. 6, 1931.  H. J. MURPHY  1,825,972
LUBRICATING APPARATUS
Filed Jan. 9, 1926   2 Sheets-Sheet 1
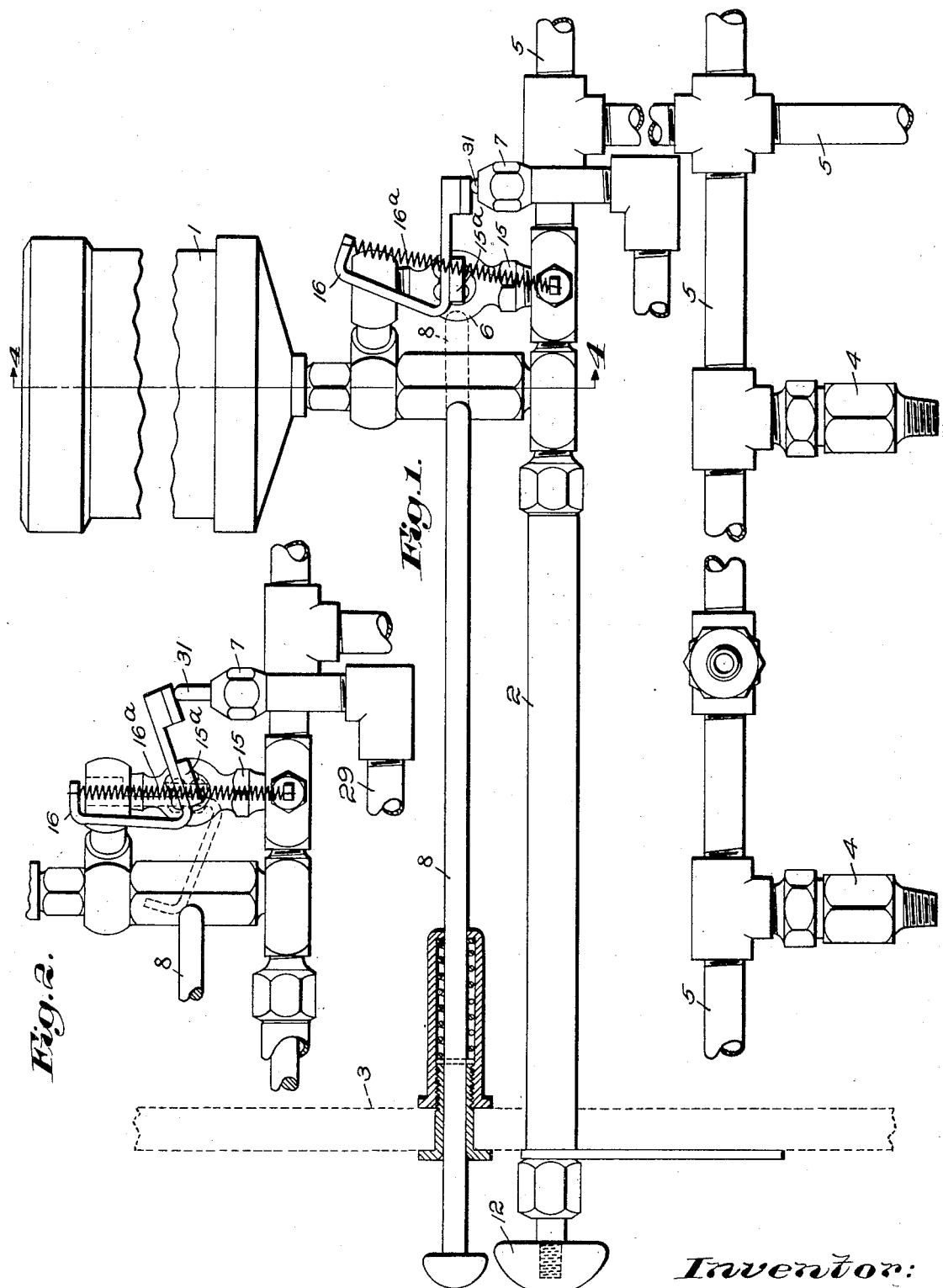
Inventor:
Howard J. Murphy,
by Emery Booth Janney Varney
Attys.

Oct. 6, 1931.                H. J. MURPHY                1,825,972
                          LUBRICATING APPARATUS
                    Filed Jan. 9, 1926         2 Sheets-Sheet 2
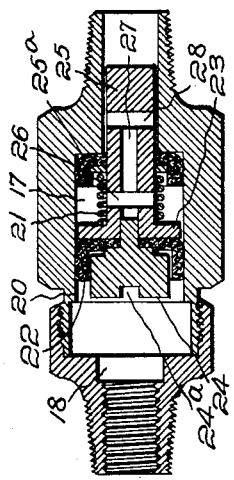
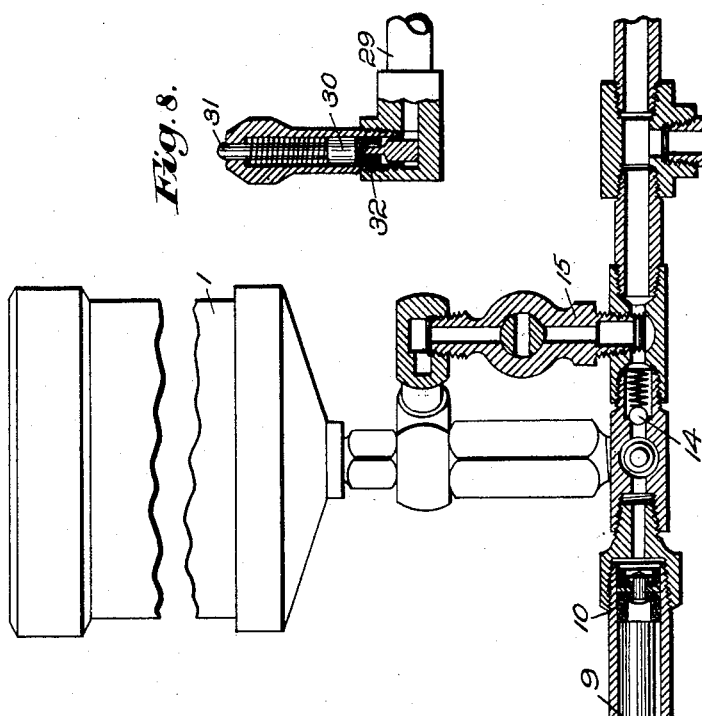
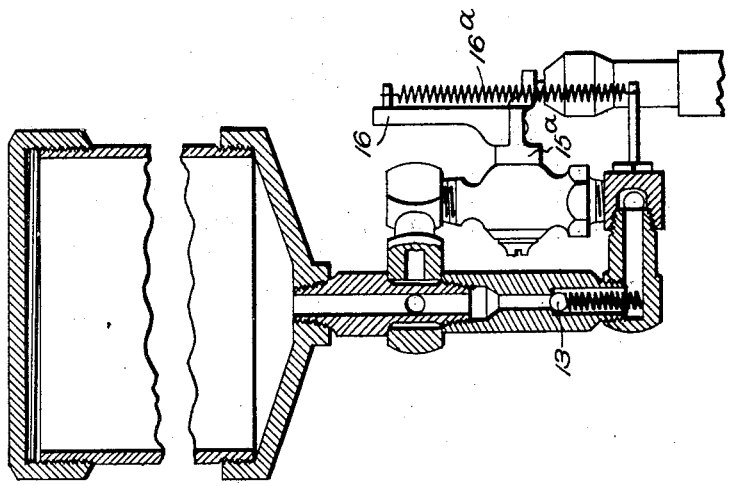
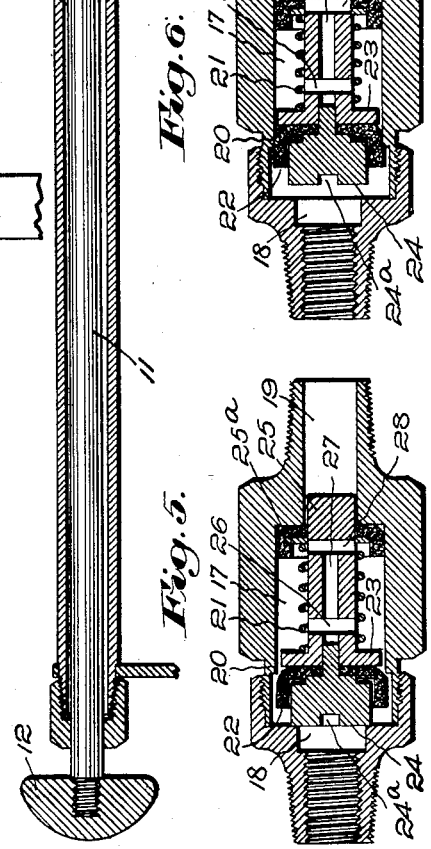
Inventor:
Howard J. Murphy
by Emery Booth Janney Varney Attys.

Patented Oct. 6, 1931

1,825,972

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed January 9, 1926. Serial No. 80,244.

This invention aims to provide improvements in lubricating apparatus.

In the drawings which illustrate a preferred embodiment of my invention,

Fig. 1 is a side elevation of a hand-operated central lubricating system showing some of the connecting pipes and the supply tank broken away and showing the valve rod casing in cross-section;

Fig. 2 is a side elevation of a portion of the system showing the valve operating mechanism in operation and showing the valve lever dotted in one position;

Fig. 3 is a section through the pump and valves, showing the supply tank and connecting parts in elevation;

Fig. 4 is a section on the line 4—4 of Fig. 1 being partly in elevation;

Figs. 5, 6 and 7 are somewhat enlarged sectional views of the charge determining device showing various positions of the expelling means; and Fig. 8 is a sectional view of the lubricant operated device for closing the valve to shut off the supply of lubricant.

Referring to the drawings, I have shown a central lubricating system which is particularly though not exclusively useful as a system whereby the bearings of a motor vehicle may be lubricated simultaneously by operation of a pump which may be located at the dash of the vehicle. The system is simple and may be easily and quickly operated to force a predetermined charge of lubricant under pressure to each bearing.

By using the hereinafter described system there is no necessity of individual lubrication of each bearing, therefore much time is saved as well as doing away with the necessity of reaching under dirty parts of the vehicle as when each bearing is lubricated separately. The device which I am about to describe, may be conveniently operated by the operator without moving from the seat of the motor vehicle.

The system illustrated in Fig. 1 includes a supply tank or reservoir 1 of any convenient size, a hand pump 2 secured to the dash 3 shown in dotted lines and connected to the tank 1. A plurality of charge determining devices or cups 4 are connected in series with the pump 2 by suitable pipes 5. I have also provided a pressure reducing rotary snap valve 6 with a cooperating pressure regulated device 7 and a hand-operated plunger rod 8 secured to the dash 3 as illustrated.

The pump 2 (Fig. 3) comprises a cylinder having a lubricant chamber 9 from which the lubricant is forced to the lubricant cups 4. A piston 10 is provided within the cylinder of the pump and a piston rod 11 projects from the piston 10 through the dash and has a handle 12 secured to its outer end for operating the piston 10. Between the tank and the inner end of the pump cylinder is arranged a suitable check valve 13 (Fig. 4) which opens to permit passage of lubricant from the tank but prevents return of lubricant in the opposite direction.

The pipes 5 may be connected to the inner end of the pump by a single connection and from there they may branch off in any direction to the devices 4 each of which is usually located close to or directly to the part to be lubricated.

A second check valve 14 is interposed between the pump and the single connecting pipe so as to prevent return of lubricant from the pipe system to the pump as hereinafter more fully described.

Between the check valve 13 and the tank and between the check valve 14 (Fig. 3) and the pipe system I have provided a by-pass conduit 15 in which is located the pressure reducing valve 6 as illustrated in Fig. 3. The means for operating the valve 6 may be supported in any suitable manner for best operation of the valve. This valve 6 is of the rotary type and has a stem 15ª projecting through the side of its casing to which is secured a double finger piece 16 (Figs. 1 and 4) which is held against either the device 7 or the end of the push-rod 8 as shown in Figs. 1 and 2 by the spring 16ª.

Each charge determining device, as illustrated in Figs. 5, 6 and 7, includes a charge determining chamber 17 having an enlarged bore at the inlet end of the device. Inlet 18 and outlet 19 are provided at opposite ends of the chamber while a piston 20 is located within the chamber and normally urged toward the inlet passage by a spring 21.

The piston comprises a cup-shaped washer 22 back-supported by a metal disk portion 23 and secured in place by a part 24. Integral with the disk portion 23 is a piston stem 25 which is surrounded by a flexible washer 25ª held at the outlet end of the chamber by the spring 21. The stem is bored at 26, 27 and 28 to provide a by-pass for passage of lubricant from the chamber 17.

The pressure regulating device 7, as illustrated in Fig. 8, includes a cylinder connected by a pipe 29 to any suitable point in the pipe system 5 and has a piston 30 and piston stem 31 located in the cylinder for operation by the pressure of the lubricant which acts upon the cup leather 32 of the piston to force the piston stem out of the end of the cylinder.

When the system is not in use the relation of parts is as follows: The piston 10 of the hand pump is at the innermost end of the chamber 9, the rotary pressure reducing valve 6 is closed (Fig. 2) and the pistons 20 in the devices 4 are located at the inlet ends of the chambers 17 as illustrated in Fig. 5. The remainder of the parts are held in the positions shown in Figs. 1 and 4.

When it is desirable to lubricate the parts to be lubricated (not shown), the operator merely grasps the handle 12 of the pump 2 and forces it backward and forward until the valve 6 opens and releases the pressure in the pipe system. This latter operation will be indicated to the operator, so that he may discontinue pumping, because as soon as the relief valve 6 opens the pump will suddenly work very easily. During the pumping operation lubricant is drawn by suction from the tank 1 past the ball check 13 into and filling the chamber 9. When the piston 10 is forced into the chamber, the lubricant is forced therefrom, under pressure, past the ball check 14 through the pipe system 5 to the various devices 4. At first the lubricant passes through the slot 24ª in the part 24, then around the piston 20 in each device, as shown in Fig. 5, thereby filling the chamber 17 of each device. The by-passes in the piston stems 25 are closed while the chambers 17 are being filled with lubricant thereby to prevent direct passage of lubricant from the chambers 17 to the parts to be lubricated. After each chamber is filled the pressure of the lubricant in the pipes 5 acts upon the pistons 20 to force them into the smaller part of the chambers 17 thereby cutting off the flow of lubricant to the chambers, as shown by Fig. 6. It should be noted that the by-pass in the piston stem 25 is still closed and remains so until the piston 20 has moved slightly beyond closing position thereby insuring against possibility of direct passage of lubricant from the pipe system to the parts to be lubricated.

During the travel of the piston between closing the opening into the chamber 17 and opening the by-pass in the piston stem 25 the lubricant may leak past the cup washer 22 from the chamber to permit movement of the piston after the inlet to the chamber 17 is closed. From the instant the bore 28 passes the flexible washer 25ª until the end of the stroke of the piston the lubricant passes from the chamber 17 through the bores 26, 27 and 28, into the outlet passage 19, as shown in Fig. 7. The quantity of the lubricant depends upon the stroke and the cross-sectional area of the chamber 17 minus the cross-sectional area of the piston stem 25. Therefore by changing the dimensions of any one or all of these elements the quantity of lubricant may be varied to suit the requirements of each bearing.

While the lubricant is being discharged from the lubricant measuring devices the pressure on the lubricant in the system acts upon the piston 30 in the device 7 thereby urging the plunger 31 against one of the fingers of the finger pin 16, as illustrated in Fig. 2. The plunger stem pushes upon the piece 16 (Fig. 2) and turns the rotary valve until the spring 16ª, which is secured to the other finger and to a stationary part, is moved slightly over a center line between the stationary point of the spring and the center of the valve. Then the spring automatically operates the valve 6 until the second finger rests against the end of the plunger rod 8 as shown in dotted lines in Fig. 2. In this position the valve 6 is open and sufficient lubricant may return from the system to the tank to relieve the pressure on the pistons 20 in the devices, thereby permitting the springs 21 to force the pistons back to their normal positions where the lubricant may again fill the cups and the operation may be repeated.

Before again operating the pump the operator should press upon the knob of the plunger rod 8 to push upon the second mentioned finger of the finger device 16, thereby carrying the spring 33 past the center again so that it may throw the first mentioned finger against the piston stem 31 and close the valve 6, as shown in Fig. 1, thereby placing the system in proper position for operation.

While I have shown and described a preferred embodiment of my invention it should be understood that changes involving omission, substitution, alteration and reversal of parts and even changes in the mode of operation may be readily made without departing from the scope of my invention, which is best defined in the appended claims.

Claims:

1. A lubricating system comprising, in combination, a supply reservoir, a plurality of charge-determining devices for supplying a predetermined quantity of lubricant under pressure to each of a plurality of parts to be lubricated, conduits connecting said supply with said devices, pump means for forcing the lubricant from said reservoir through said conduits to said devices under pressure, valve means preventing return of lubricant from the conduits to said reservoir, a by-pass valve between the conduits and said reservoir, and lubricant pressure operated valve opening means for opening said by-pass valve to permit lubricant to pass from said conduits to said reservoir thereby to reduce the pressure of the lubricant in said conduits only after a predetermined quantity of lubricant has been forced from said devices.

2. A lubricating system comprising, in combination, a supply reservoir, lubricant cups located adjacent parts to be lubricated, a pump adapted to receive lubricant from said reservoir, valve means for preventing return of lubricant from said pump to said reservoir, a plurality of conduits connecting all of said cups with said pump, means cooperating with each cup and operable by the pressure of the lubricant in said conduits to force a predetermined quantity of lubricant from each of said cups to the parts to be lubricated, a relief valve between said conduits and said reservoir, means for closing said valve prior to forcing lubricant through the system, and a lubricant operated device for opening said valve after lubricant has been supplied to the parts to be lubricated.

3. A lubricating system comprising, in combination, a supply reservoir, lubricant cups located adjacent to parts to be lubricated, a pump adapted to receive lubricant from said reservoir, valve means for preventing return of lubricant from said pump to said reservoir, a plurality of conduits connecting all of said cups with said pump, means cooperating with each cup and operable by the pressure of the lubricant in said conduits to force a predetermined quantity of lubricant from each of said cups to the parts to be lubricated, a relief valve between said conduits and said reservoir, a lever secured to said valve, a push rod for engagement with said lever to move said valve toward one position, a lubricant operated plunger device for moving said valve toward the other position, and a spring secured to said lever and tending to maintain said valve in either position.

4. A lubricating system comprising, in combination, a supply reservoir, lubricant cups located adjacent to parts to be lubricated, a pump adapted to receive lubricant from said reservoir, valve means for preventing return of lubricant from said pump to said reservoir, a plurality of conduits connecting all of said cups with said pump, means cooperating with each cup and operable by the pressure of the lubricant in said conduits to force a predetermined quantity of lubricant from each of said cups to the parts to be lubricated, and a snap valve by-pass device for reducing the pressure in the system, said valve being adapted to be closed by manually operable means and opened by lubricant pressure operated means.

5. A lubricating system comprising, in combination, a supply reservoir, lubricant cups located adjacent to parts to be lubricated, pump means adapted to receive lubricant from said reservoir, a plurality of conduits connecting all of said cups with said pump, means cooperating with each cup and operable by the pressure of the lubricant in said conduits to force a predetermined quantity of lubricant from each of said cups to the parts to be lubricated, a snap valve by-pass device for reducing the pressure in the system, said valve being adapted to be closed by manually operable means and opened by lubricant pressure operated means, the pressure operated means comprising a plunger rod, piston means for reciprocating said plunger rod, a housing for said plunger rod and piston means, and a conduit connected to said housing to convey lubricant thereto for operation of the means therein.

6. In lubricating apparatus of the class described, a supply reservoir, measuring valves each located adjacent a bearing to be lubricated, a pump supplied from said reservoir and adapted to force lubricant under pressure to said measuring valves, conduits connecting said measuring valves with said pump, means in each measuring valve responsive to variations in lubricant pressure to supply a predetermined quantity of lubricant to the bearing with which its measuring valve communicates, movable means for automatically relieving the pressure in said conduits, and means for maintaining said movable means in pressure relieving position.

7. A lubricating system comprising, in combination, a source of lubricant supply, pump means fed therefrom, measuring cups each adjacent a bearing to be lubricated, branched conduits supplied by said pump and leading to said cups, a valve for releasing the pressure in said conduits, separate means actuated by lubricant pressure for opening said valve to completely relieve said pressure, and manual means for closing said valve.

8. In lubricating apparatus of the class described, a system comprising a source of lubricant supply, a manually operated pump fed therefrom, metering means adjacent a bearing to be lubricated, conduit means connecting said metering means and supplied from said pump, a valve automatically opened by a predetermined pressure in said conduit means to completely relieve the pressure in said conduit means, and separate manual means for closing said valve.

In testimony whereof, I have signed my name to this specification.

HOWARD J. MURPHY.